United States Patent Office 3,347,934
Patented Oct. 17, 1967

3,347,934
PROCESS FOR THE PREPARATION OF ALKOXYMETHOXYALKANOLS
Sheldon N. Lewis, Willow Grove, Pa., assignor to Rohm & Haas Company, Philadelphia, Pa., a corporation of Delaware
No Drawing. Filed Feb. 28, 1966, Ser. No. 530,399
12 Claims. (Cl. 260—615)

This invention relates to a novel process for the preparation of alkoxymethoxyalkanols. More particularly, this invention relates to the process of preparing alkoxymethoxyalkanols by reacting an alkanol with a lower alkyl or aryl epoxide and formaldehyde in the presence of a basic catalyst.

Alkoxymethoxyalkanols which may be hereinafter referred to as hydroxy formals or formals, are generally well known in the art and processes for their preparation have been described in United States Patents 2,321,593, 2,321,608 and 2,359,134.

The Gresham Patent 2,321,593 discloses a process for preparing (methoxymethoxy) ethanol by reacting ethylene glycol formal with methanol in the presence of an acidic catalyst. After neutralization, the product is recovered by fractional distillation. Loader in United States 2,321,608 teaches the preparation of glycol ethers by hydrogenation of alkoxy-substituted aliphatic organic acids and their esters. This reaction requires the presence of a hydrogenation catalyst and, in addition thereto, relatively high temperature and pressure. In United States 2,359,134, Loader prepares the hydroxy formal by hydrolysis of methoxymethoxy-2-ethyl chloride which is obtained by reacting methylol with ethylene chlorohydrin in the presence of an acid.

While the prior art teaches several processes for the preparation of hydroxy formals, all are characterized by a common problem, namely, a resultant equilibrium mixture which leads to great difficulty in separating the desired formals from the contaminating materials produced during the process. Such contaminants possess boiling points which correspond very closely to those of the hydroxy formals being prepared so that it is extremely difficult or even impossible to isolate the formals in the desired purity. The process of the present invention is a novel and improved method of producing the valuable alkoxymethoxyalkanols in purities in excess of 95%.

The present invention involves a process which comprises reacting in the presence of an effective amount of a basic catalyst (1) an alkanol of the formula

ROH where R is alkyl of 1 to 8 carbon atoms or aralkyl of 7 or 8 carbon atoms with (2) a 1,2-epoxide of the formula

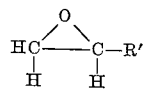

where R' is hydrogen, methyl, ethyl or phenyl, and (3) formaldehyde, so as to result in an hydroxy formal of the formula

wherein R and R' are as hereinabove described.

The alkanols of the formula ROH are typically methanol, ethanol, propanol, isopropanol, 1-butanol, n-amyl alcohol, heptanol, octanol, 2-ethylhexanol or benzyl alcohol. Methanol is the preferred reactant.

The 1,2-epoxides

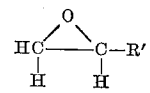

are ethylene oxide, butylene oxide, propylene oxide or styrene oxide.

Typical alkanols produced by the process of this invention include methoxymethoxy-2-ethanol
1-methoxymethoxy-2-propanol
ethoxymethoxy-2-ethanol
propoxymethoxy-2-butanol
isopropoxymethoxy-2-ethanol
butoxymethoxy-2-propanol
heptoxymethoxy-2-butanol
octoxymethoxy-2-ethanol
benzyloxymethoxy-2-propanol
2-(methoxymethoxy)-1-phenyl ethanol The following general equation is illustrative of the novel process of this invention.

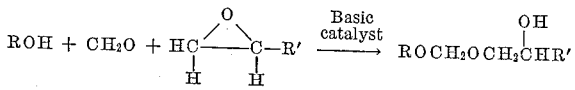

Fundamentally, the reaction involves equimolecular proportions of the reactants. However, the reaction will proceed to completion where the reactants, namely the alkanol, the formaldehyde and the 1,2-epoxide are present in a molar ratio of 15–1:8–1:1 respectively. Indeed, an excess of alkanol and formaldehyde will generally result in greater yields of the sought-after formals. In this regard, a ratio of 4:2:1 methanol: formaldehyde: propylene oxide resulted in a 60% yield of 1-methoxymethoxy-2-propanol.

Depending upon the reactants selected, it may or may not be necessary or desirable to use a solvent. When a solvent is desired or required, it is preferable to use an excess of the alkanol reactant. Usually, any inert organic solvent such as benzene, toluene, xylene, ethylene dichloride, carbon tetrachloride, dioxane, diethyl ether, dimethylformamide, butyl acetate, dibutyl phthalate, ethyl propionate, methyl ethyl ketone, methyl isobutyl ketone and the like or mixtures of such solvents may be satisfactorily employed.

As previously stated, the process of this invention requires the presence of a basic type catalyst, such as for example, sodium methoxide, sodium ethoxide, sodium propoxide, potassium methoxide, potassium butoxide, sodium hydroxide, calcium hydroxide, triethylamine, tributylamine, guaternary ammonium hydroxide, or a macroreticular-structured anion exchange resin. Clearly, the above stated compounds are by no means intended to be exhaustive but merely suggestive of the catalysts suitable for this invention. The catalyst selected may be used alone or in combination with any other basic catalyst or group of basic catalysts. Such catalysts should be present in the amount of 0.001 to 50.0 mole percent, preferably in the range of 1.0 to 20.0 mole percent based on the molar amount of the 1,2-epoxide reactant.

Where the boiling points of the reactants permit, the reaction is usually and preferably carried out under reflux conditions. However, the pressure, atmospheric, super- or subatomspheric, employed in any particular preparation will be dependent upon the normal variables evident to one skilled in the art. It may at times be desirable or even necessary to utilize an increased pressure, for example, where an epoxide reacant such as ethylene oxide is extremely volatile at atmospheric pressure.

Generally the reaction is carried out at temperatures in the range of 0 to 250° C., preferably 50 to 150° C.

Of course, the process will usually require longer periods of time to proceed to completion where the reactants are subjected to lower than room temperatures. When desired, the rate of reaction may be accelerated by subjecting the reactants to increased pressure and/or temperature.

Upon completion of the reaction, the hydroxy formals are easily separated from the resulting mixture by distillation. The particular ease with which the contaminants are separated from the resulting reaction product makes possible consistently high yields of markedly pure hydroxy formal. Because of this unique ability to produce formals which are easily separable from the impurities, the process of the present invention is a significantly valuable advance in the art.

The following examples are offered so as to more fully understand the present invention. They are offered by way of illustration and not by way of limitation. Parts are by weight unless otherwise stated.

*Example 1.—Preparation of methoxymethoxy-2-ethanol*

A clear solution comprising a suspension of 63.0 g. (2.0 moles) 95% paraformaldehyde, 5.0 g. sodium methoxide and 64.0 g. (2.0 moles) of methanol was stirred and cooled in a Dry Ice acetone bath. The solution was diluted with 88.0 g. (2.0 moles) of ethylene oxide and charged to a 300 ml. stainless steel stirred autoclave. A pressure of 300 p.s.i. nitrogen was applied and the stirred reaction mixture maintained at 95° C. for twelve hours. The reactants were neutralized with solid carbon dioxide and distilled through an 18 inch Vigreaux column, giving a 20% yield of colorless methoxymethoxy-2-ethanol with a B.P. of 52–56° C. at 7–8 mm. and a refractive index of 1.4111 at 25° C. A product with a purity in excess of 95% was obtained in this manner.

*Example 2.—Preparation of 1-methoxymethoxy-2-propanol*

A suspension of 504 g. (16 moles) of 95% paraformaldehyde, 1024 g. (32 moles) of methanol, and 41.0 g. (0.4 mole) of triethylamine were charged to a stirred three-necked reaction flask equipped with a thermometer and an 18 inch Vigreaux condenser under a variable take-off distillation head. Homogeneity of these reactants was effected by gentle warming. Subsequently, 464 g. (8 moles) of propylene oxide was added. The clear, colorless solution was then heated at total reflux under a nitrogen atmosphere. After 8 hours total reflux, the reaction mixture was distilled at total take-off at atmospheric pressure. A colorless liquid in the amount of 1073 g. was collected at a pot temperature of 110° C. and a head temperature of 75° C. The brown liquid residue was then distilled at reduced pressure resulting in 570 g.; a 60% yield of 1-methoxymethoxy-2-propanol. The hydroxy formal so obtained was a colorless liquid with a B.P. of 47–48° C. at 5 mm. and a refractive index of 1.4104 at 25° C.

A sample of the 1-methoxymethoxy-2-propanol was distilled through a one meter spinning-band column and a fraction with a B.P. of 53.9–54.0° C. at 9.0 mm. and a refractive index of 1.4110 at 25° C. was collected.

By analysis the fraction so obtained was found to contain 50.01% C and 10.17% H. The calculated values on the basis of the empirical formula $C_5H_{12}O_3$ are 49.98% C and 10.07% H. Thus, a product with a purity in excess of 95% was obtained.

The hydroxy formals produced by the process of this invention are valuable as solvents, which can be used alone or in conjunction with various other solvents so as to impart their valuable properties in any particular system. They are particularly useful as flotation agents, absorbents for refrigerants, degreasing solvents, carbon removers and the like. In addition the hydroxy formals produced by the novel process disclosed herein are utilized in the synthesis of valuable monomers. Said monomers can be prepared by reacting the formals with α, β-monoethylenically unsaturated carboxylic acids, such as acrylic acid, methacrylic acid, maleic acid, fumaric acid, itaconic acid or aconitic acid. The monomers so prepared are particularly valuable in coating systems. They may be homopolymerized or copolymerized with comonomers such as other acrylic and methacrylic esters, vinyl acetate, vinyl propionate, vinyl butyrate, vinyl laurate, vinyl stearate, acrylonitrile, vinylidene chloride, styrene, vinyl toluene and the like. In addition, the hydroxy formals prepared by the process of this invention can be reacted with saturated acids such as formic, acetic, propionic, butyric, isobutyric and the like to form the esters thereof.

What is claimed is:
1. A process which comprises reacting at a temperature in the range of 0 to 250° C. in the presence of an effective amount of a basic catalyst
   (1) a compound of the formula ROH where R is alkyl of 1 to 8 carbon atoms or aralkyl of 7 or 8 carbon atoms with
   (2) a 1,2-epoxide of the formula

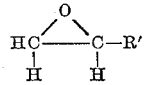

where R' is hydrogen, methyl, ethyl or phenyl, and
   (3) formaldehyde in a molar ratio of 15–1:1:8–1 respectively, so as to result in an hydroxy formal of the formula

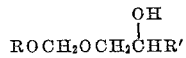

wherein R and R' are as hereinabove described.
2. A process according to claim 1 wherein the catalyst is present in the amount of 1.0 to 20.0 mole percent based on the molar amount of the 1,2-epoxide reactant.
3. A process according to claim 1 wherein the reaction is carried out at a temperature in the range of 50 to 150° C.
4. A process according to claim 1 wherein the alkanol is methanol.
5. A process according to claim 1 wherein the 1,2-epoxide is ethylene oxide.
6. A process according to claim 1 wherein the 1,2-epoxide is propylene oxide.
7. A process according to claim 1 wherein the basic catalyst is sodium methoxide.
8. A process according to claim 1 wherein the basic catalyst is triethylamine.
9. A process according to claim 1 wherein the hydroxy formal produced is methoxymethoxy-2-ethanol.
10. A process according to claim 1 wherein the hydroxy formal produced is 1-methoxymethoxy-2-propanol.
11. A process according to claim 1 wherein the catalyst is present in the amount of 0.001 to 50.0 mole percent based on the molar amount of the 1,2-epoxide reactant.
12. A process according to claim 1 wherein the reactants ROH, 1,2-epoxide, and formaldehyde are present in the molar ratio of 4:1:2 respectively.

References Cited

UNITED STATES PATENTS 2,796,423  6/1957  Cottle et al. _____ 260—615

LEON ZITVER, *Primary Examiner.*

H. T. MARS, *Assistant Examiner.*